(12) United States Patent
Negulescu et al.

(10) Patent No.: US 8,122,698 B2
(45) Date of Patent: Feb. 28, 2012

(54) VENT FOR THE LUBRICATING OIL SYSTEM OF A JET ENGINE

(75) Inventors: Dimitrie Negulescu, Berlin (DE); Alastair McIntosh, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 739 days.

(21) Appl. No.: 12/155,099

(22) Filed: May 29, 2008

(65) Prior Publication Data
US 2009/0025363 A1 Jan. 29, 2009

(30) Foreign Application Priority Data
Jun. 1, 2007 (DE) .......................... 10 2007 026 060

(51) Int. Cl.
*F02C 7/06* (2006.01)
(52) U.S. Cl. ..................................... 60/39.08
(58) Field of Classification Search ................. 60/39.08; 184/6.11
See application file for complete search history.

(56) References Cited

U.S. PATENT DOCUMENTS

| 2,613,498 | A | | 10/1952 | Prendergast |
| 3,382,670 | A | | 5/1968 | Venable |
| 3,528,241 | A | | 9/1970 | Venable |
| 4,034,939 | A | * | 7/1977 | Ridley, Jr. et al. .............. 244/87 |
| 4,531,358 | A | | 7/1985 | Smith |
| 4,576,001 | A | | 3/1986 | Smith |
| 7,699,266 | B2 | * | 4/2010 | Martin Hernandez ........ 244/131 |
| 2002/0178729 | A1 | * | 12/2002 | Care et al. ........................ 60/772 |

FOREIGN PATENT DOCUMENTS

| DE | 1 601 566 A | 2/1970 |
| DE | 2008 209 A1 | 9/1970 |
| DE | 31 37 947 A1 | 4/1982 |
| DE | 34 03 401 A1 | 8/1984 |

* cited by examiner

*Primary Examiner* — Ehud Gartenberg
*Assistant Examiner* — Vikansha Dwivedi
(74) *Attorney, Agent, or Firm* — TImothy J. Kilma; Shuttleworth & Ingersoll, PLC

(57) ABSTRACT

The air exit hole of the vent line (6) connected to a venting apparatus for the lubricating oil system of a jet engine is arranged behind the nozzle throat (2) on the periphery of the exiting engine jet (4). The exit hole is tangentially arranged on the periphery of the engine jet, or slightly enters the rim area of the engine jet. The vent line extends under the protection of an aerodynamically shaped fairing (5, 11). This arrangement of the air exit, while being simply designed, cost-effective and weight-saving, provides for clean, invisible discharge of air from the oil venting apparatus.

19 Claims, 2 Drawing Sheets

VENT FOR THE LUBRICATING OIL SYSTEM OF A JET ENGINE

Figure 1:
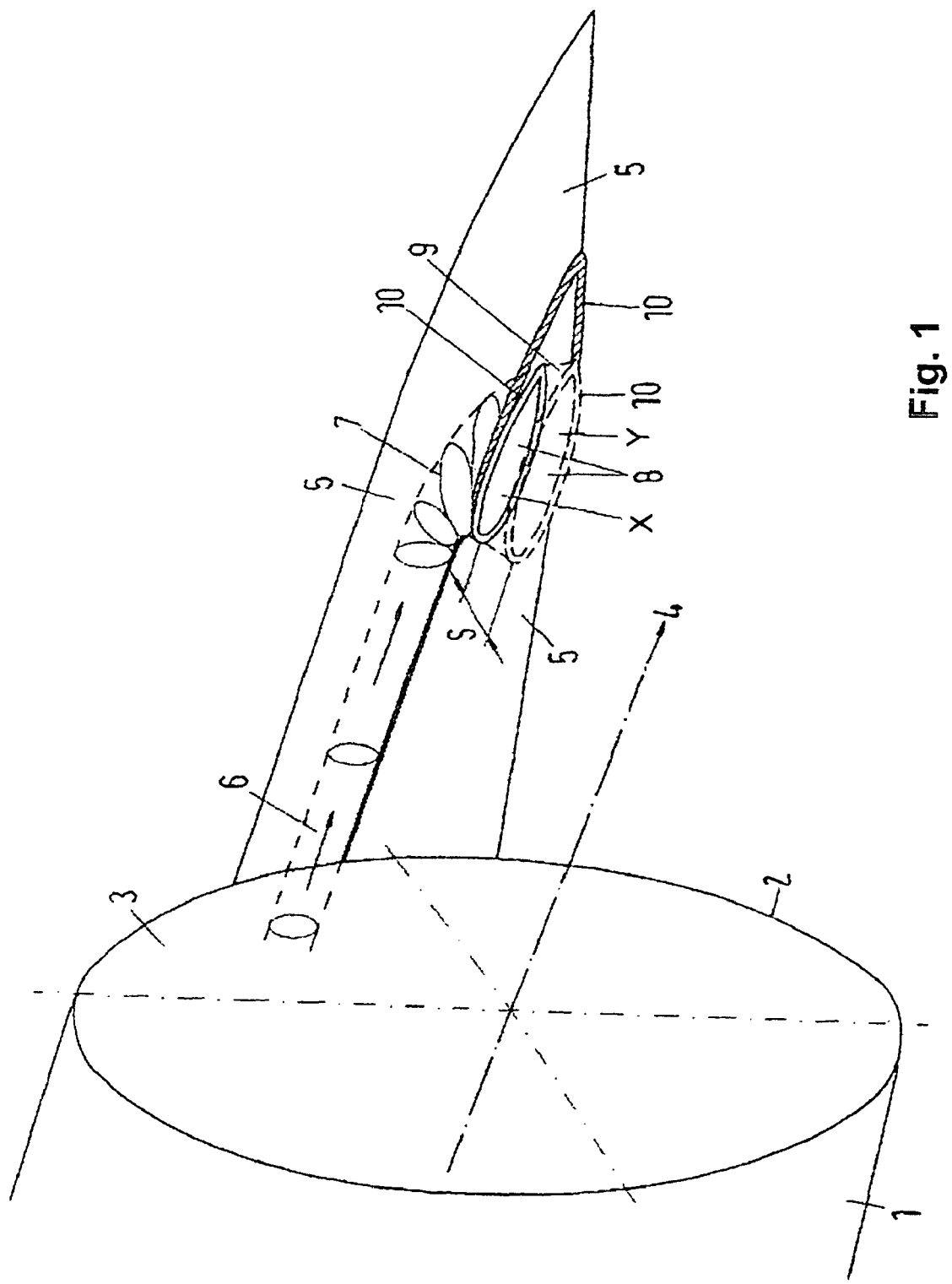

This application claims priority to German Patent Application DE102007026060.3 filed Jun. 1, 2007, the entirety of which is incorporated by reference herein.

This invention relates to a vent for the lubricating oil system of a jet engine having a vent line originating at a venting apparatus and terminating with an air exit hole issuing to the atmosphere.

In the bearing housings of jet engines, the lubricating oil mixes with sealing air which is separated from the lubricating oil scavenged to the oil tank by a venting apparatus and issued to the atmosphere via an air exit. Before the air is discharged to the atmosphere, all oil droplets contained in it should as entirely as possible have been removed. Actually, residues of oil will still be present in the air discharged.

In a known design variant, the separated air is issued to the atmosphere outside of the nacelle via an aerodynamically faired air exit at a position with minimum counter pressure. Apart from the resistance caused by the exit in flight, this design variant is further disadvantageous in that an undesired, visible smoke plume is produced during aircraft standstill, taxiing and take-off.

In accordance with yet another known design variant, the air exit may also be provided behind the nozzle throat, i.e. at the end of an extension of the low-pressure turbine cone. This type of air exit is only suitable for engines with short nozzles and requires a complex oil system design with shaft-concentric venting arrangement through the rotating shafts, this being both costly and heavy.

The present invention, in a broad aspect, provides for an air exit of the vent of the lubricating system of a jet engine which, while being simply designed, is arranged such that, on the one hand, the vent discharge gas is invisible and, on the other hand, in-flight resistance due to the installation of the exit is low.

In accordance with the basic idea of the present invention, the air exit hole of the vent line connected to a venting apparatus of the oil system is disposed behind the nozzle throat at any point relative to the periphery of the exiting engine jet, actually tangentially to the latter. This arrangement of the air exit, while being simply designed, cost-effective and weight-saving, provides for clean, invisible discharge of air from the oil venting apparatus.

An aerodynamic fairing of the vent line, for which the usual fairing of the engine mount, and if applicable, elongated by an additional fairing, can largely be utilized, provides for low installation resistance at low cost expenditure.

In a further development of the present invention, an oil drip edge is provided at the rim of the air exit hole and/or the rear edge of the engine mount fairing or the additional fairing which prevents oil from spreading, and respectively soiling the aircraft, when the aircraft is at standstill.

In accordance with a further important feature of the present invention, the air exit hole and the elbow are aerodynamically shaped in the flow direction of the engine jet.

The present invention is more fully described in light of the accompanying drawings showing a preferred embodiment. In the drawings, FIG. 1 shows the jet exit side of the nozzle of a jet engine with the fairing for the engine mount and the air exit of the oil system, and FIG. 2 shows in schematic representation three variants for the arrangement of the air exit and its aerodynamic fairing.

Figure 2:
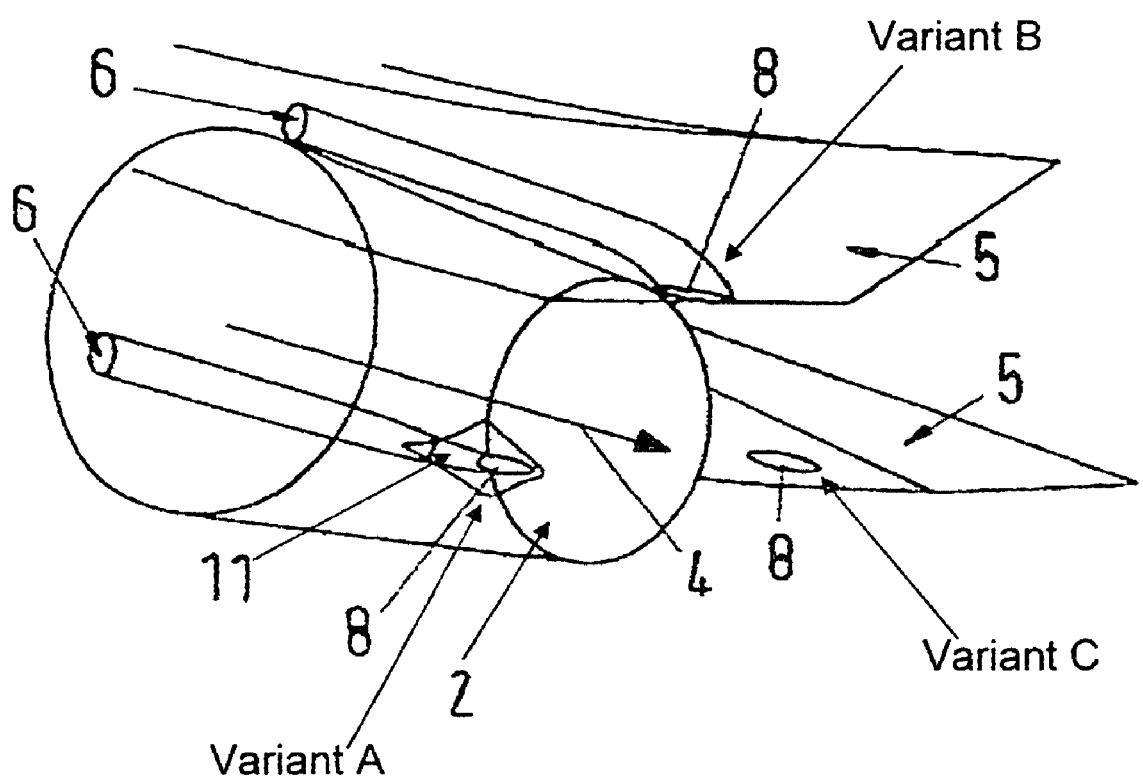

FIG. 1 schematically shows a part of the nacelle 1 of the engine with the nozzle throat 2 and the engine jet exiting from the nozzle opening 3 (jet exit opening), as indicated by arrowhead 4. The engine is here arranged for installation in 3 o'clock position on the fuselage of an aircraft. The engine mount (not shown) is covered—in the present version—by a long engine mount fairing 5 (pylon) extending beyond the jet exit opening 3 to reduce air resistance. A vent line 6 connected too a venting apparatus 12 of the lubricating oil system of the engine is routed out of the nacelle 1 and, under the protection of the long engine mount fairing 5, to a point behind the nozzle opening 3, terminating in an elbow 7 which is curved towards to the engine jet and whose air exit hole 8 issues at or in the engine jet, respectively. The opening plane of the air exit hole 8 of the elbow 7 is—aerodynamically advantageously—oriented tangentially to the flow direction or the periphery of the engine jet, respectively, and extends preferably tangentially at the peripheral rim of the engine jet 4 (arrowhead X) or slightly enters—with a depth s—the rim area of the engine jet (arrowhead Y).

This arrangement and shape of the air exit of the vent is simply designed and cost-effective and, moreover, does not produce additional air resistance in flight. The air discharged from the oil system is issued to the engine jet so that no smoke plume is produced during standstill, taxiing or take-off of the aircraft.

As shown in FIG. 1, an oil drip edge 10 is formed onto the circumferential rim of the air exit hole 8 of the extension 9 of the elbow 7 reaching into the engine jet 4 or on the rearward rim of the engine mount fairing 5 to drag off oil droplets or disrupt the oil flow, thereby avoiding soiling of the aircraft during standstill of the latter.

The present invention is not limited in application to the variant described in the above in FIG. 1 with an engine with long engine mount fairing suspended on the port side of the aircraft fuselage. Various modifications can be made to the above-described invention without departing from the inventive concept of an arrangement of the air exit hole issuing at any point and under the protection of an aerodynamic fairing, tangentially to, or tangentially entering the periphery of the engine jet. If the engine is suspended on the underside of the aircraft wing, the vent line, with the air exit hole parallel to the engine jet direction, can be arranged in the 12 o'clock position, protected by the respective engine mount fairing.

In yet another engine installation on the aircraft fuselage featuring a short engine mount fairing which does not extend beyond the nozzle opening, an additional fairing can be provided for the part of the vent line and the elbow in the 3 o'clock or 9 o'clock position, on which a drip edge can also be provided for disrupting the oil flow (drag-off).

Variant B shown in FIG. 2 provides an engine mount fairing 5 arranged between the nacelle of the engine and an aircraft wing which extends beyond the rearward rim (jet exit opening 3) of the nozzle throat 2 and under the protection of which the vent line 6, with the air exit hole 8 tangent to the engine jet, extends in 12 o'clock position.

As shown by variant C, the air exit hole 8 is arranged in the area of the long engine mount fairing 5 connected to the aircraft fuselage, as also shown in FIG. 1, behind the jet exit opening 3 in 3 o'clock position.

Variant A, shown in FIG. 2, is provided for engine mounts featuring only a short engine mount fairing that does not extend beyond the end of the nozzle throat 2. On the nacelle 1, an additional fairing 11 is here provided under the protection of which the air exit opening 8 is tangent to the periphery of the engine jet 4.

LIST OF REFERENCE NUMERALS

1 Nacelle of the engine
2 Nozzle throat
3 Jet exit opening (nozzle throat opening)
4 Engine jet exit direction, engine jet
5 Engine mount fairing
6 Vent line
7 Elbow of 6
8 Air exit hole of 7
9 Extension of 7
10 Oil drip edge
11 Additional fairing
Arrowhead X Tangent air exit opening
Arrowhead Y Entering air exit opening

What is claimed is:

1. A vent for a lubricating oil system of a jet engine, comprising:
a vent line connectable to a venting apparatus and terminating with an air exit hole issuing to the atmosphere, wherein the vent line is routed through an interior of an aerodynamic fairing provided on the engine such that the air exit hole is positioned downstream of an exhaust opening of an exhaust nozzle throat of the jet engine, with a plane of the air exit hole being oriented parallel to and facing an exhaust flow of the jet engine from the exhaust opening and positioned radially with respect to the exhaust flow between a position tangential to the exhaust flow and a position extending radially inwardly into the exhaust flow so that the air exit hole directly issues into the exhaust flow.

2. The vent of claim 1, wherein the aerodynamic fairing is a long engine mount fairing extending beyond an end of the nozzle throat and suspending the engine on at least one of a fuselage and wing of the aircraft.

3. The vent of claim 2, and further including an oil drip edge provided on at least one of an outer periphery of the air exit hole and a rearward rim of the aerodynamic fairing.

4. The vent of claim 3, and further including an elbow to transition flow from the vent line to the air exit hole.

5. The vent of claim 4, wherein the air exit hole and the elbow are aerodynamically shaped in a flow direction of the exhaust flow.

6. The vent of claim 5, wherein the air exit hole is positionable to issue air at any point in a circumferential direction around the exhaust flow depending on the engine suspension on the at least one of the fuselage and wing of the aircraft.

7. The vent of claim 1, wherein the aerodynamic fairing is an extension to a short engine mount fairing.

8. The vent of claim 7, and further including an oil drip edge provided on at least one of an outer periphery of the air exit hole and a rearward rim of the aerodynamic fairing.

9. The vent of claim 8, and further including an elbow to transition flow from the vent line to the air exit hole.

10. The vent of claim 9, wherein the air exit hole and the elbow are aerodynamically shaped in a flow direction of the exhaust flow.

11. The vent of claim 10, wherein the air exit hole is positionable to issue air at any point in a circumferential direction around the exhaust flow depending on an engine suspension on at least one of a fuselage and wing of the aircraft.

12. The vent of claim 1, and further including an oil drip edge provided on at least one of an outer periphery of the air exit hole and a rearward rim of the aerodynamic fairing.

13. The vent of claim 12, and further including an elbow to transition flow from the vent line to the air exit hole.

14. The vent of claim 13, wherein the air exit hole and the elbow are aerodynamically shaped in a flow direction of the engine jet.

15. The vent of claim 14, wherein the air exit hole is positionable to issue air at any point in a circumferential direction around the exhaust flow depending on an engine suspension on at least one of a fuselage and wing of the aircraft.

16. The vent of claim 1, and further including an elbow to transition flow from the vent line to the air exit hole.

17. The vent of claim 16, wherein the air exit hole and the elbow are aerodynamically shaped in a flow direction of the engine jet.

18. The vent of claim 17, wherein the air exit hole is positionable to issue air at any point in a circumferential direction around the exhaust flow depending on an engine suspension on at least one of a fuselage and wing of the aircraft.

19. The vent of claim 1, wherein the air exit hole is positionable to issue air at any point in a circumferential direction around the exhaust flow depending on an engine suspension on at least one of a fuselage and wing of the aircraft.

\* \* \* \* \*